United States Patent
Wang et al.

(10) Patent No.: US 7,459,878 B2
(45) Date of Patent: Dec. 2, 2008

(54) METHOD AND CIRCUIT FOR CONTROLLING SENSORLESS SINGLE-PHASE BLDCM

(75) Inventors: Weizi Wang, Shanghai (CN); Zhigan Wu, Shanghai (CN); Wanbing Jin, Shanghai (CN); Jianping Ying, Shanghai (CN); Shih-Ming Huang, Taoyuan Shien (TW); Wen-Shi Huang, Taoyuan Shien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 394 days.

(21) Appl. No.: 11/328,975

(22) Filed: Jan. 10, 2006

(65) Prior Publication Data

US 2006/0214611 A1    Sep. 28, 2006

(30) Foreign Application Priority Data

Mar. 28, 2005    (TW)    .............................. 94109620 A (51) Int. Cl.
*H02P 23/00* (2006.01)
(52) U.S. Cl. ....................... 318/798; 318/787; 318/788; 318/820
(58) Field of Classification Search ................ 318/798, 318/787, 788, 802, 801, 567, 803, 800, 659
See application file for complete search history.

(56) References Cited

U.S. PATENT DOCUMENTS

| | | | |
|---|---|---|---|
| 5,598,071 A | 1/1997 | Dunfield et al. | |
| 2005/0110514 A1* | 5/2005 | Trifilo | ........................ 324/772 |
| 2005/0237023 A1* | 10/2005 | Zhang | ........................ 320/128 |

FOREIGN PATENT DOCUMENTS

CN        2632936 Y        8/2004

* cited by examiner

*Primary Examiner*—Karen Masih
(74) *Attorney, Agent, or Firm*—Volpe and Koenig P.C.

(57) ABSTRACT

The method and circuit for controlling a sensorless single-phase BLDCM having a stator with a winding are proposed. The provided controlling circuit includes a power supply circuit, an inverter coupled to the winding and the power supply circuit, a BEMF detecting circuit coupled to the winding and the inverter and measuring a BEMF of the winding, and a controller coupled to the power supply circuit, the inverter and the BEMF detecting circuit and analyzing a status of the BEMF to control the BLDCM accordingly. The provided method is based on the motor winding time-sharing theory, and the controller controls the inverter to make the winding used as a driving element with loading current when the absolute value of the BEMF is relatively large and as a sensing element when the absolute value of the BEMF is relatively small.

19 Claims, 11 Drawing Sheets

METHOD AND CIRCUIT FOR CONTROLLING SENSORLESS SINGLE-PHASE BLDCM

FIELD OF THE INVENTION

The present invention relates to the control of a single-phase brushless DC motor (BLDCM). More particularly, the present invention relates to the control of a sensorless single-phase BLDCM.

BACKGROUND OF THE INVENTION

Figure 1:
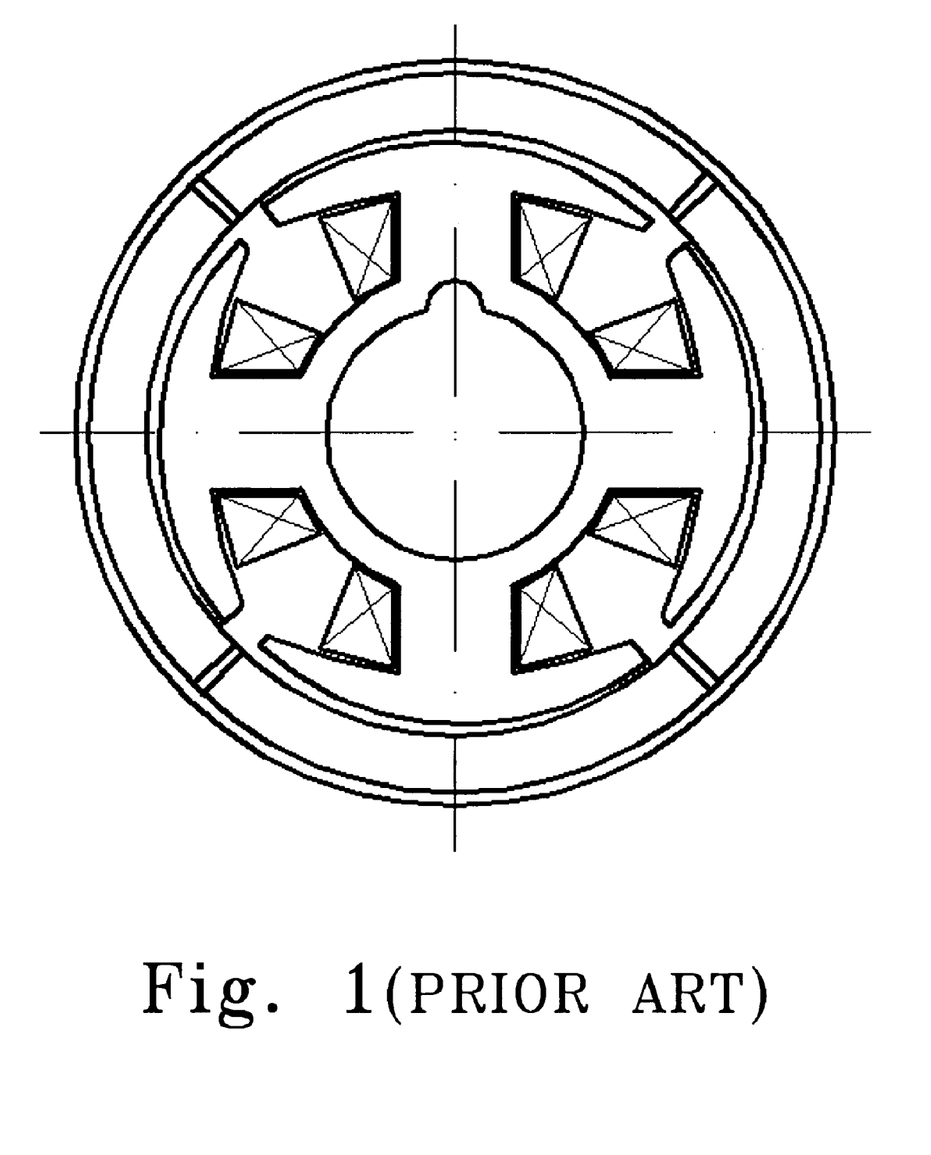
FIG. 1 shows the configuration of a conventional single-phase BLDCM having a stator and a rotor.

The single-phase BLDCM requires a suitable current commutation signal synchronized with the rotor position for proper operation. In most applications, a Hall-effect position sensor is used to detect the rotor position and control the motor. However, the Hall-effect sensor itself increases the size of the motor system and the manufacturing costs. Besides, the Hall-effect sensor decreases the capability of the system against the environment variation, e.g., the temperature variation. Many Hall-less BLDCM drives that detect the rotor position have been introduced. FIG. 1 shows the configuration of a conventional single-phase BLDCM having a stator and a rotor.

Figure 2:
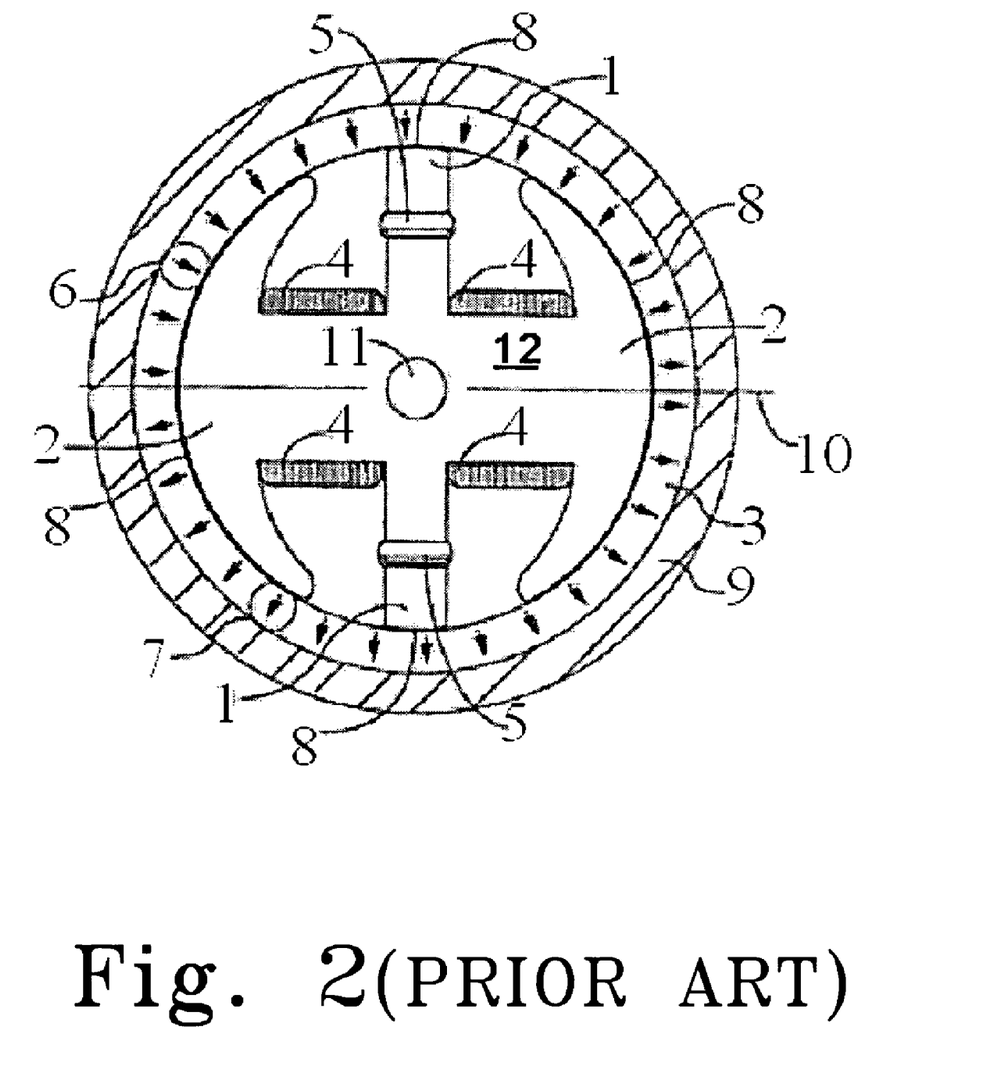
FIG. 2 shows the configuration of a single-phase BLDCM with the sensing coils fitted around the additional poles of the stator in the prior art.

In order to avoid the use of the Hall-effect sensor, a method employing a sensing coil to determine the rotor position is proposed in U.S. Pat. No. 5,598,071, and the configuration of the disclosed single-phase BLDCM having a stator and a rotor is shown in FIG. 2. Referring to FIG. 2, the BLDCM includes a magnet 3, a coil 4, a starter winding 5, an air gap 8, a rotor 9, an opening 11, and a stator 12 having four poles (1 and 2). In which, the arrows such as 6 and 7 are employed to indicate that the magnet 3 is radically magnetized, the magnetic field distribution is asymmetrical about axis 9, the coil 4 is wrapped around the poles 2 of stator 12, and the starter winding 5 is fitted around the poles 1 of stator 12. Besides, the starter winding 5 has sufficiently large number of turns to get a high back electromotive force (BEMF) constant and be used to sense the BEMF signal. Furthermore, a controller can also control the BLDCM successfully with the BEMF signal However, the additional poles 1 are introduced to the stator 12, which makes the motor configuration more complicated and the space for placing the coil 4 smaller.

Figure 3:
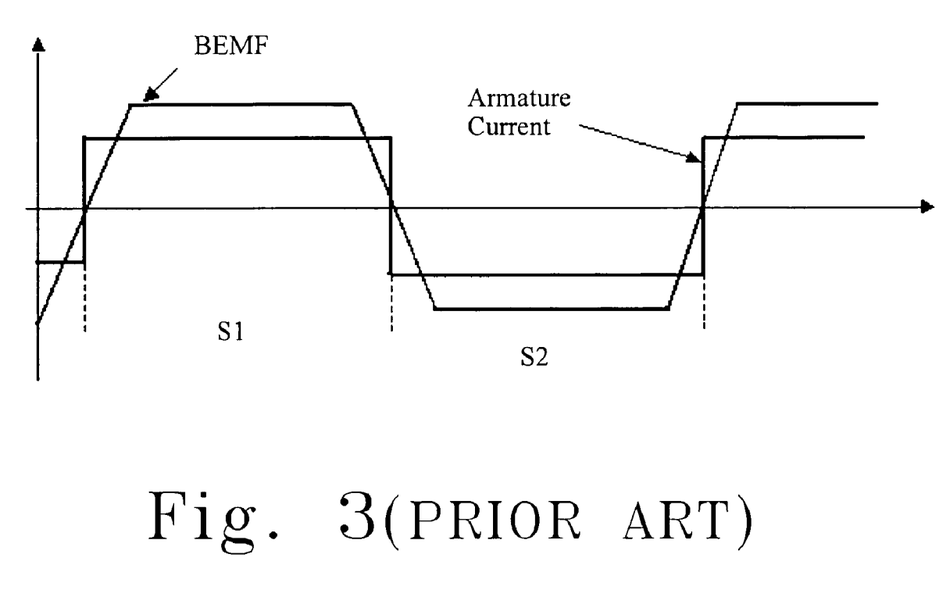
FIG. 3 shows the relationship between the BEMF and the armature current of stator winding of the conventional BLDCM having a sensor.

FIG. 3 shows the relationship between the BEMF and the armature current of stator winding of the conventional BLDCM having a sensor. The motor is controlled through two steps S1 and S2. In each step, the controller gets the rotor position from the sensor, e.g., a Hall sensor, and analyzes the BEMF signal, then makes it possible that the armature current just has the relationship with BEMF as shown in FIG. 3 by controlling the four switches of the H-bridge of the stator.

Keeping the drawbacks of the prior arts in mind, and employing experiments and research full-heartily and persistently, the applicants finally conceived the method and circuit for controlling a sensorless single-phase BLDCM.

SUMMARY OF THE INVENTION

It is therefore an object of the present invention to propose a controlling method and a controlling circuit for a sensorless single-phase BLDCM such that the rotor position sensor and the additional sensing coil could be omitted.

It is therefore another object of the present invention to propose a method and a circuit for controlling a sensorless single-phase BLDCM such that the Hall-effect sensor in a conventional BLDCM, which decreases the capability of the system against the environment variation, could be omitted and a relatively simpler configuration without the limitation of space for placing the sensing coil could be achieved.

According to the first aspect of the present invention, the controlling method of a BLDCM including an inverter, a stator having a winding, a rotor and a controller, in which a BEMF is generated while the rotor rotates, includes the steps of: (a) controlling the inverter to let a first current having a first direction flow to the winding so as to rotate the rotor; (b) cutting off a loop flowing therethrough by the first current in the inverter at a first moment, wherein the first current flows through a flywheel current loop and is degenerated to zero at a second moment; (c) measuring a terminal voltage of the winding, which is the BEMF, and obtaining a third moment at which the BEMF drops to zero; (d) adjusting the first moment by the controller according to a relationship between the third moment and the second moment; and (e) employing a second current having a second direction to replace the first current at a fourth moment and then repeating steps (a) to (d).

Preferably, the first direction is in an opposite direction to the second direction.

Preferably, the second moment is a moment when the controller detects that the first current drops to zero.

Preferably, the second moment is a moment at the end of an operation of a specific time-delay program begun after the first moment.

Preferably, the fourth moment satisfies that when the third moment is earlier than the second moment, the fourth moment equals to the second moment, when the third moment is equal to the second moment, the fourth moment equals to the second moment, and when the third moment is later than the second moment, the fourth moment equals to the third moment.

Preferably, the fourth moment satisfies that when the third moment is earlier than the second moment, the fourth moment equals to the second moment, when the third moment is equal to the second moment, the fourth moment equals to the second moment, when the third moment is later than the second moment, the fourth moment is earlier than the third moment, and the higher a rotation speed of the BLDCM is the more the fourth moment is earlier than the third moment when the BLDCM rotates in a relatively high speed.

Preferably, the BLDCM is a single phase BLDCM and a driving alternative of the BLDCM is a bipolar driving.

Preferably, the step (d) further includes the steps of: decreasing a value of the first moment if the third moment is earlier than the second moment; decreasing the value of the first moment if the third moment is equal to the second moment; maintaining the value of the first moment if the third moment is later than the second moment and a delay time period thereof is less than a predetermined value; and increasing the value of the first moment if the third moment is later than the second moment and the delay time period is larger than a predetermined value.

Preferably, the predetermined value is one of zero and a value larger than zero.

According to the second aspect of the present invention, the controlling circuit of a BLDCM, which includes a rotor and a stator having a winding, includes: a power supply circuit supplying a first current having a first direction, an inverter electrically connected to the winding and the power supply circuit, wherein the first current is provided to the winding by switching on the inverter and cut off from the winding by switching off the inverter, a BEMF detecting circuit electrically connected to the winding and the inverter and measuring a terminal voltage of the winding when the first current is cut off and a current in the winding drops to zero, which is a back electromotive force (BEMF), and a controller electrically connected to the power supply circuit, the inverter and the BEMF detecting circuit and analyzing a status of the BEMF to control the BLDCM accordingly.

Preferably, the inverter includes four switches.

Preferably, the power supply circuit includes at least one selected from the group consisting of a diode, a resistor and a capacitor.

Preferably, the BEMF detecting circuit is one of a comparator circuit and a combination of a voltage divider and an over-voltage protection circuit, and includes a diode and a resistor.

Preferably, the first current is cut off by the inverter at a first moment, the current in the winding drops to zero at a second moment, the BEMF drops to zero at a third moment, and a value of the first moment is adjusted by the controller according to a relationship between the second moment and the third moment.

Preferably, the controller is engaged in a commutation at a fourth moment and the inverter is switched on by the controller such that the power supply circuit provides a second current, which is in an opposite direction to the first current, to the winding.

Preferably, the relationship includes: (a) when the third moment is earlier than the second moment, the value of the first moment is decreased by the controller and the inverter is switched on to provide the second current to the winding immediately, (b) when the third moment is later than the second moment and a delay time thereof is less than a predetermined value, the value of the first moment is kept unchanged by the controller and the inverter is switched on to provide the second current to the winding at the fourth moment, (c) when the third moment is later than the second moment and the delay time is equal to the predetermined value, the value of the first moment is kept unchanged by the controller and the inverter is switched on to provide the second current to the winding at the fourth moment, and (d) when the third moment is later than the second moment and the delay time is larger than the predetermined value, the value of the first moment is increased by the controller and the inverter is switched on to provide the second current to the winding at the fourth moment.

Preferably, the BLDCM further includes a rotor, the BEMF is generated in the winding while the rotor rotates, and the controller is employed to decide whether the fourth moment is less than the third moment according to a rotation speed of the rotor.

Preferably, the controller is employed to decide whether the fourth moment is equal to the third moment according to the rotation speed of the rotor.

Preferably, the BEMF detecting circuit is a comparator circuit.

Preferably, the BEMF detecting circuit is an analog-to-digital conversion circuit.

The present invention may best be understood through the following descriptions with reference to the accompanying drawings, in which:

BRIEF DESCRIPTION OF THE DRAWINGS

FIGS. 5(*a*)-(*c*) are graphs illustrating three possible relationships between the current and the BEMF of the present invention;

DETAILED DESCRIPTION OF THE PREFERRED EMBODIMENT

The method for controlling the sensorless single-phase BLDCM having an inverter, a stator with a winding, a rotor and a controlling circuit with a controller and a BEMF detecting circuit for detecting the BEMF of the winding and adhere to the H-bridge of the stator is proposed in the present invention. The provided method is based on the motor winding time-sharing, and the controller controls the inverter to make the winding used as a driving element with loading current in the winding flowing in the same direction as the BEMF when the absolute value of the BEMF is relatively large and as a sensing element with little current when the absolute value of the BEMF is relatively small. The controller would adjust the time period of the winding employed as a driving element and engage the commutation of the rotor according to the BEMF detected such that the BLDCM would operate with relatively higher efficiency and in the steady state.

Figure 4:
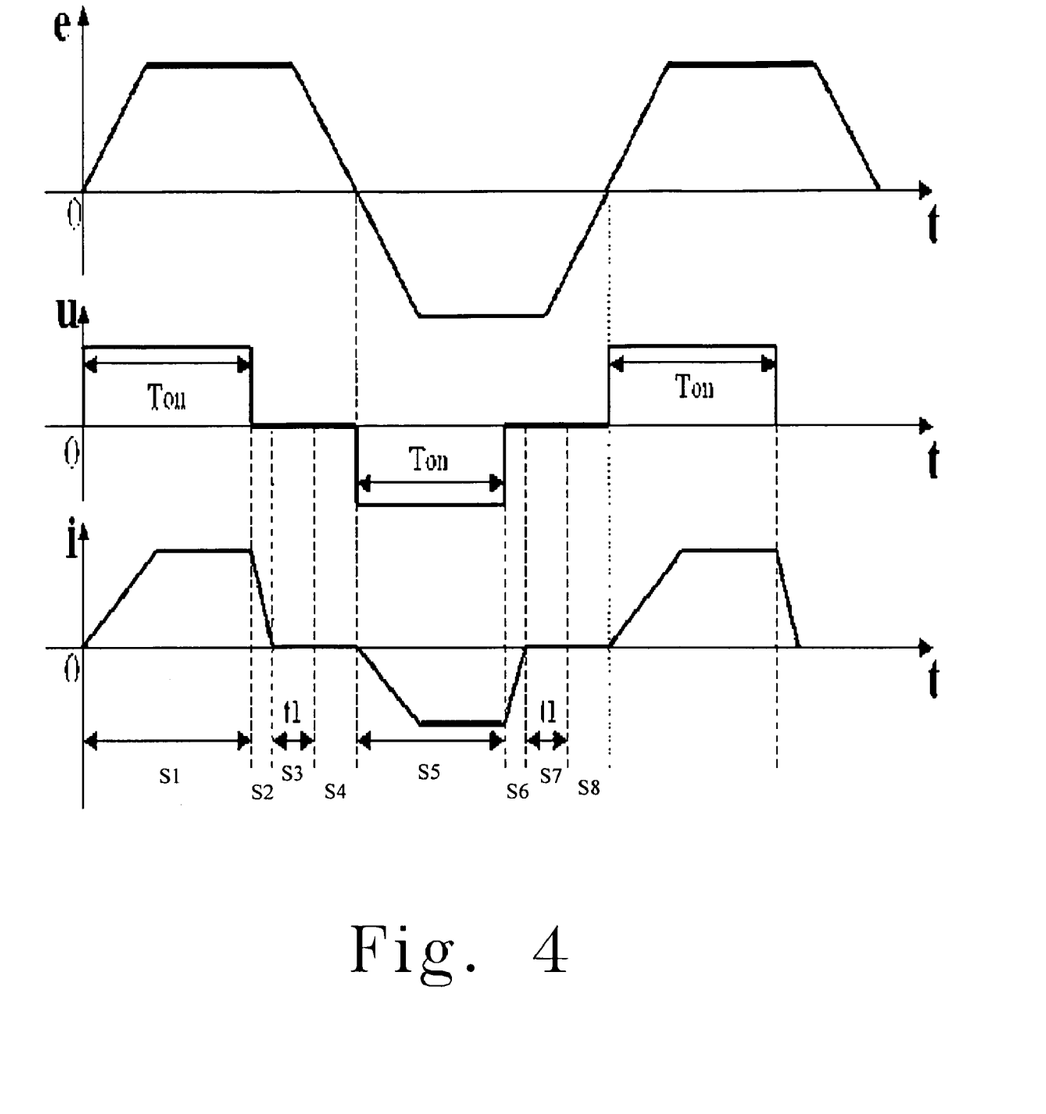
FIG. 4 is a graph respectively illustrating the curves of the BEMF, the terminal voltage of the winding and the current of the motor winding versus time of the present invention.

Please refer to FIG. 4, it respectively shows the curves of the BEMF (e), the terminal voltage of the winding (u) and the current of the motor winding (i) versus time (t) of the present invention. As shown in FIG. 4, one control cycle is divided into eight stages, S1, S2, S3, S4, S5, S6, S7 and S8. The first half of the control cycle includes S1, S2, S3 and S4, and the second half of the control cycle includes S5, S6, S7 and S8.

During the period of S1 of the first half of the control cycle, the controller controls one phase of the inverter working on for time Ton (Usually, Ton is just a little bit smaller than half of the control cycle) and the power supply voltage is supplied to the BLDCM such that the loading current in the winding having a first direction and flowing in the same direction as the BEMF. Then, all the switches in the inverter are switched off to cut off the power supply voltage from the BLDCM. Because of the motor inductance, the current in the winding will decrease to zero gradually during the period of S2. During the period of stages S3 and S4, the winding current is almost zero and the BLDCM is rotating because of its inertia, and the terminal voltage of the winding is the BEMF generated by the rotation of the rotor. Thus, the controller can get the BEMF by measuring the terminal voltage of the winding directly, would adjust Ton according to the status of the BEMF, engage the commutation at the zero-crossing point (ZCP) of the BEMF and set the control strategy of the next half of the control cycle according to the BEMF.

During the period of S5 of the second half of the control cycle, the controller controls one phase of the inverter working on for time Ton and the power supply voltage is supplied to the BLDCM such that the winding current has a second direction and flows in the same direction as the BEMF. Then, all the switches in the inverter are switched off to cut off the power supply voltage from the BLDCM. Because of the motor inductance, the winding current will decrease to zero gradually during the period of S6. During the period of stages S7 and S8, the winding current is almost zero and the BLDCM is rotating because of its inertia, and the terminal voltage of the winding is the BEMF generated by the rotation of the rotor. So, the controller can get the BEMF by measuring the terminal voltage of the winding directly, would adjust Ton according to the status of the BEMF, engage the commutation at the ZCP of the BEMF and set the control strategy of the next half of the control cycle according to the BEMF.

Figure 5:
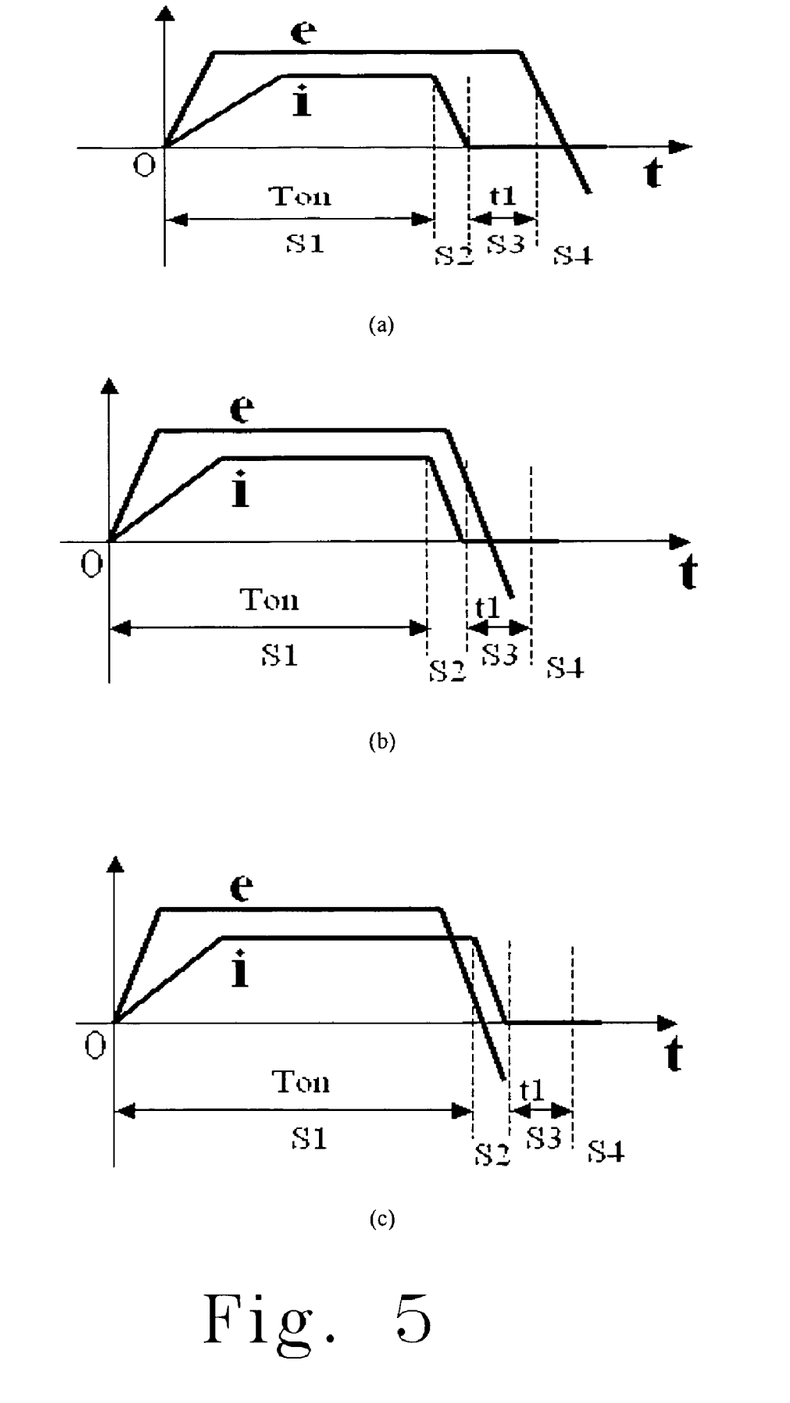

After the stage S2 of the first half of the control cycle, in which the winding current becomes zero, the controller can get the BEMF by measuring the terminal voltage of the winding. There are three possible relationships between the winding current and the BEMF as shown in FIGS. 5(a) to 5(c) respectively:

(1) If finding that the BEMF has already crossed the ZCP through measuring the terminal voltage of the winding after the winding current drops to zero, as shown in FIG. 5(c), the present direction of the BEMF is different from the direction of the non-zero winding current in S2, Ton is considered too large and the controller would decrease Ton, and then the controller controls the inverter to accomplish the commutation such that the winding current would have a second direction and enters its next half of the control cycle immediately with the updated Ton.

(2) If finding that the ZCP of the BEMF has not appeared yet through measuring the terminal voltage of the winding after the winding current drops to zero and the ZCP of the BEMF appears until stage S4, as shown in FIG. 5(a), the present direction of the BEMF is the same as the direction of the non-zero winding current in S2, Ton is considered too small and the controller would increase Ton and detect the BEMF continuously until the ZCP is found, and then the controller controls the inverter to accomplish the commutation such that the winding current would have a second direction and starts the next half of the control cycle with the updated Ton.

(3) If finding that the ZCP of the BEMF has not appeared yet through measuring the terminal voltage of the winding after the winding current drops to zero and the ZCP of the BEMF appears until stage S3, as shown in FIG. 5(b), the present direction of the BEMF is the same as the direction of the non-zero winding current in S2, Ton is considered just right and the controller would keep Ton unchanged and detect the BEMF continuously until the ZCP is found, and then the controller controls the inverter to accomplish the commutation such that the winding current would have a second direction and starts the next half of the control cycle with the updated Ton.

The control method employed during the second half of the control cycle is similar to the first half of the control cycle except that another phase of the inverter is active instead. After the stage S6 of the second half of the control cycle, in which the winding current becomes zero, the controller can get the BEMF by measuring the terminal voltage of the winding also. Three possible relationships between the winding current and the BEMF are just the same as those of the first half of the control cycle. The controller would adjust Ton and engage the commutation according to the same control strategy just like the first half of the control cycle.

Through the adjustments according to the above-mentioned control strategy, the ZCP of BEMF would only occur during the periods of stages S3 and S7 of the first half and the second half control cycles respectively. Here, introducing the periods of stages S3 and S7 could increase the system performance, and the time period of S3, namely t1, could be very short or even zero.

With the aforementioned control strategy employed in both the first half and the second half control cycles, the BLDCM would run smoothly under all kinds of environments.

Figure 6:
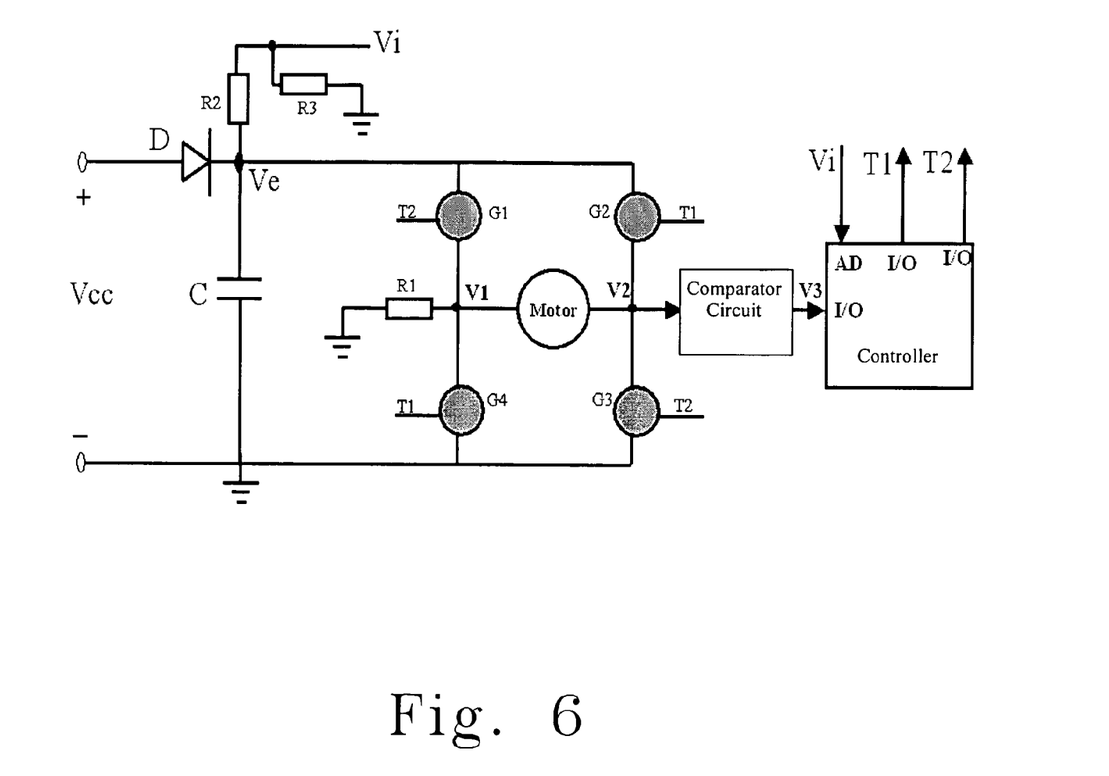
FIG. 6 is the schematic circuit diagram of the first preferred embodiment of the BLDCM and the controlling circuit of the present invention.

FIG. 6 shows the schematic circuit diagram of the first preferred embodiment of the BLDCM and the controlling circuit of the present invention. In FIG. 6, the controlling circuit of the BLDCM includes the inverter having switches G1 to G4, the resistors R1 to R3, the capacitor C, the diode D, the comparator circuit, and the controller. Please refer to FIG. 6, the controller sends control signals, T1 and T2, to control the switches G1 to G4 in the inverter. Besides, the resistances of the resistors, R1, R2, R3, and the resistors in the comparator circuit are much larger than the resistance of the winding resistor relatively (which means the resistance of the winding resistor could be ignored).

With the above-mentioned control mode, when the switches in the inverter, such as G1 and G3, or G2 and G4, are switched on and off through the control of the controller, the driving current is supplied to the motor winding such that the rotor will rotate. The voltage of Ve is almost equal to the power supply voltage Vcc during the operation. When all the switches are turned off, the flywheel current will charge the capacitor C in the bus because of the inductance in the winding and the diode D. So, Ve will increase until the current in the winding becomes zero. Then Ve will decrease gradually due of the leakage current of the capacitor C. That is to say, when Ve reaches its maximum value, the current in the winding decreases to zero. Generally speaking, the larger the current in the winding is, the larger the maximum value of Ve is. Thus, by analyzing the voltage labeled as Vi, the controller can get the magnitude of the power supply, the ZCP of the current and even the magnitude of the current. When the current in the winding is zero, because one free end of the resistor R1 is electrically connected to the ground, the node voltage labeled as V2, as shown in FIG. 6, is the terminal voltage of the winding and the BEMF as well. Through the comparator circuit as shown in FIG. 6, the controller can get the information of the ZCP of the BEMF, i.e. V3, by an operation of the comparator circuit such as comparing V2 and the ground. The controller can recognize the statuses of the current in the winding and the BEMF through Vi and V3, and adjust Ton and send out control signals T1 and T2 to control the inverter according to the relationships between Vi and V3 such that the BLDCM can be operated smoothly.

Figure 7:
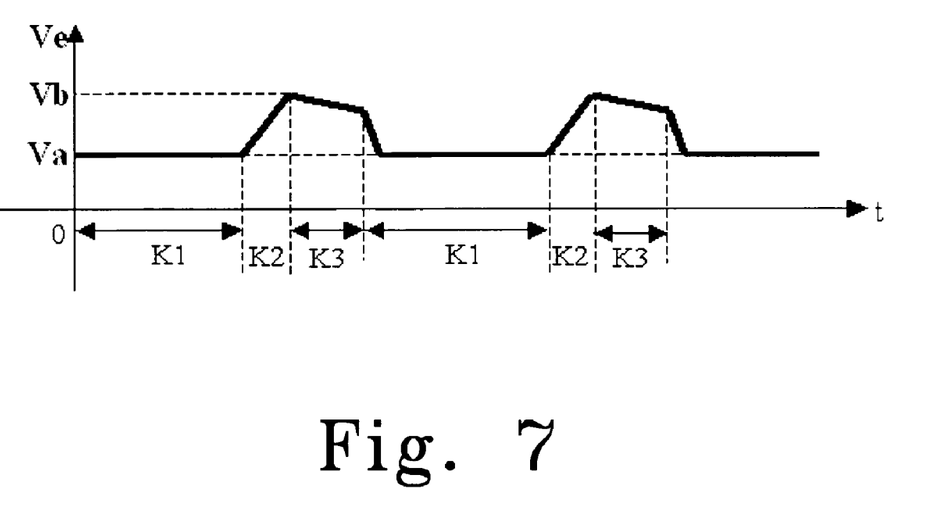
FIG. 7 is a graph illustrating the curve of Ve, as shown in FIG. 6, versus time.

Please refer to FIG. 7, it shows the curve of Ve, as shown in FIG. 6, versus time. During the time period of K1, the power supply voltage Vcc is applied to the motor winding, Ve equals to Va, and Va is almost equal to the power supply voltage Vcc. During the time period of K2, all the switches of the inverter, G1 to G4, are turned off due to the influences of the inductance of the motor winding and the diode D, the current in the winding is decreased gradually, the flywheel current charges the capacitor C such that the Ve is increased gradually, and the current in the winding is decreased to zero when Ve reaches its maximum value of Vb. During the time period of K3, all the switches of the inverter, G1 to G4, are still turned off and the voltage across the capacitor C, Ve, is lowered down from its maximum value, Vb, due to the leakage current of the capacitor C.

Figure 8:
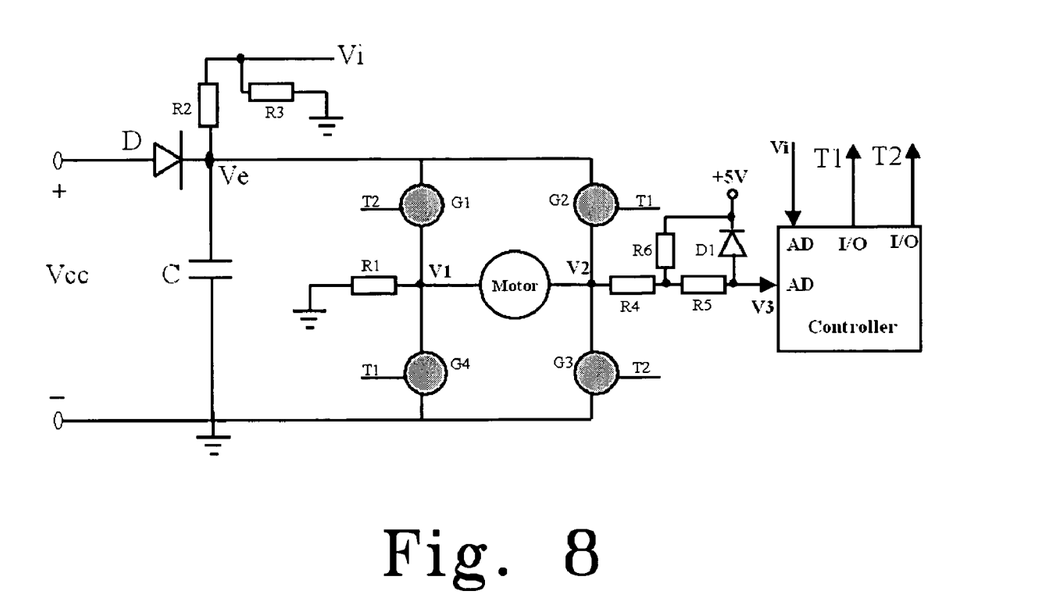
FIG. 8 is the schematic circuit diagram of the second preferred embodiment of the BLDCM and the controlling circuit of the present invention.

FIG. 8 shows the schematic circuit diagram of the second preferred embodiment of the BLDCM and the controlling circuit of the present invention. In FIG. 8, the circuit is similar to the circuit as shown in FIG. 6 except that the controller is replaced by a combination of a voltage divider and an overvoltage protection circuit, resistors R4 to R6 and diode D1. Thus, the controller can get the digital value of the BEMF from the voltage labeled as V3, which is generated by an analog-to-digital conversion through an analog-to-digital conversion circuit of the controller, when current in the winding is zero. Therefore, the controller can realize the phase commutation advance and regulate the advance angle easily because the controller can get the digital value of the BEMF.

Figure 9:
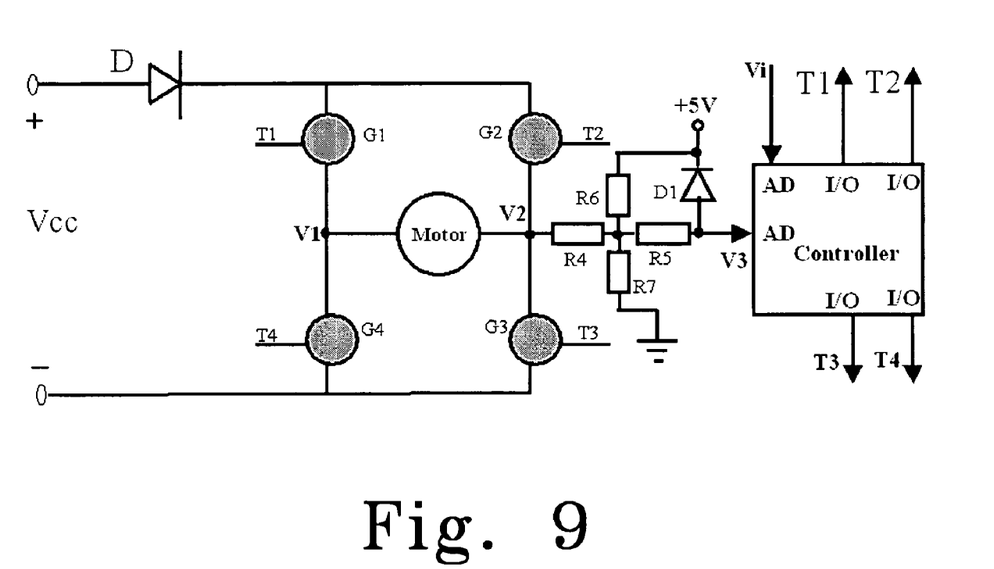
FIG. 9 is the schematic circuit diagram of the third preferred embodiment of the BLDCM and the controlling circuit of the present invention.

FIG. 9 shows the schematic circuit diagram of the third preferred embodiment of the BLDCM and the controlling circuit of the present invention. Please refer to FIG. 9, the controller sends out four controlling signals, T1, T2, T3 and T4, to control the four switches, G1, G2, G3 and G4, in the inverter separately, and relatively the resistances of the resistors, R4, R5, R6 and R7, are still much larger than the resistance of the winding resistor. The differences between the third preferred embodiment of the present invention and the first and the second preferred embodiments of the present invention are as follows:
(1) The four switches, G1, G2, G3 and G4, in the inverter are controlled by four controlling signals, T1, T2, T3 and T4 respectively.
(2) The flywheel current loop is different from those of the first and the second preferred embodiments. That is, the flywheel current will flow through the interior of the inverter when one of the switches of the H-bridge, G1 and G4, is turned on while the flywheel current is flowing.
(3) When the current in the winding becomes zero, the control signal T4 will make the switch G4 being turned on, the node of V1 is equivalent to be electrically connected to the ground, the voltage at the node of V2 is the terminal voltage of the motor winding, which is the BEMF when the current in the winding is zero. Thus, the output signal at the node of V3, which is generated by inputting V2 through the voltage divider and the over-voltage protection circuit, is the BEMF signal. The controller can get the digital value of the BEMF, which is also generated through the analog-to-digital conversion of the analog-to-digital conversion circuit of the controller.

The method for deciding the ZCP of the third preferred embodiment of the present invention is different from those of the first and the second preferred embodiments of the present invention. Because the electrical time constant of the motor is very small, the time for the current decreasing to zero is relatively small while all the switches are turned off. Thus, there in no need to detect the ZCP of the current by the controller and a time-delay program would be run to delay a long enough time for decreasing the current to zero after turning off all the switches. After that, the controller begins to detect the BEMF since the current in the winding drops to zero at the end of the time-delay program.

Figure 10:
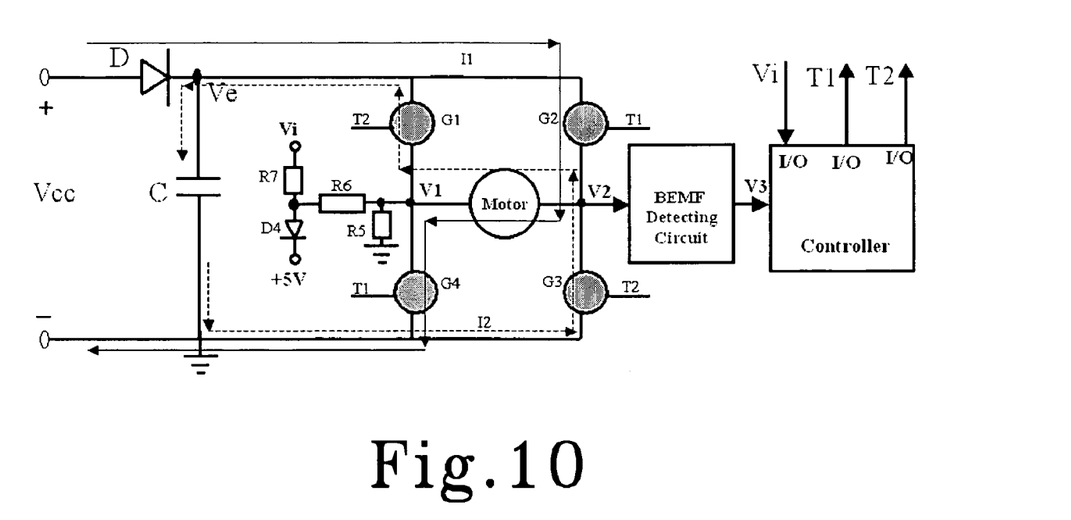
FIG. 10 is the schematic circuit diagram of the fourth preferred embodiment of the BLDCM and the controlling circuit of the present invention.

FIG. 10 shows the schematic circuit diagram of the fourth preferred embodiment of the BLDCM and the controlling circuit of the present invention. In FIG. 10, the BEMF detecting circuit could be one of the BEMF detecting circuits as shown in FIGS. 6, 8 and 9, relatively the resistances of the resistors, R5, R6 and R7 are still much larger than the resistance of the winding resistor, the diode D4 is employed for clamping the voltage Vi such that Vi is no larger than 5V. The differences between the fourth preferred embodiment of the present invention and the first, the second and the third preferred embodiments of the present invention are as follows:
(1) The BEMF detecting circuit here can get the current ZCP from the voltage jumping at Vi as shown in FIG. 10 or through the operation of the aforementioned time-delay program. In FIG. 10, the current in the route I1 will flow through the circuit when G2 and G4 are turned on, Vi is electrically connected to the ground through the conducting switch G4, and the voltage at Vi is equal to zero. When all of the switches, G1, G2, G3 and G4, are turned off, the current in the motor winding will gradually decrease to zero through the flywheel current loop, route I2 as shown in FIG. 10, due to the inductance of the motor, V1 is almost equal to the power supply voltage, Vcc (much higher than 5V in general), at the beginning of this period, the controller will get a relatively high-level voltage and Vi is approximately 5V due to the clamping of D4. When the flywheel current decreases to zero, V1 is dropping to zero and Vi is dropping to zero too because of the resistor R5. Which means, when the controller finds that Vi has been changed from the relatively high-level voltage to zero after the switches G2 and G4 are turned off, the current in the winding is zero and the controller can begin to detect the BEMF. The controller will remember dt, which is the time period for keeping the voltage Vi at the relatively high-level while the flywheel current is flowing. For the next half of the control cycle, the controller can delay the time period of dt by running the time-delay program after the switches G1 and G3 are turned off, and then the current in the winding is considered as zero too.
(2) After the current in the winding becomes zero, the controller can detect the terminal voltage of the winding (i.e. the BEMF) through the loop formed by R5, the motor winding and the BEMF detecting circuit since R5 is electrically connected to the ground.
(3) The controller will analyze the information regarding the current in the winding and the BEMF according to Vi and V3, employ the aforementioned controlling strategies to adjust Ton, and commutate motor at the proper time such that the motor could be operated smoothly.

Figure 11:
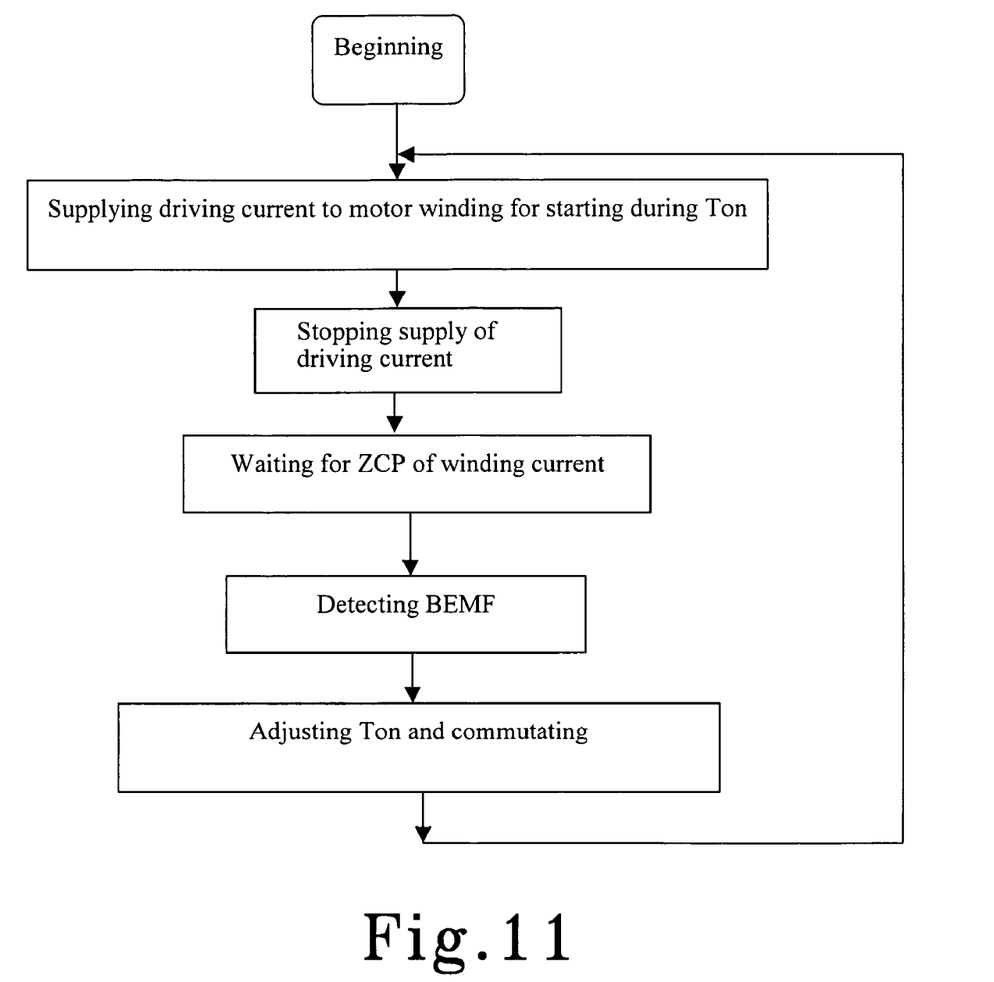
FIG. 11 shows the flow chart of the proposed controlling method of the present invention.

FIG. 11 shows a flow chart of the above-mentioned methods for controlling the sensorless single-phase BLDCM of the present invention. The main points of the pioposed methods are that a current is provided to the motor winding during the time period Ton to make the rotor rotate firstly, then stop the current secondly, wait for the current ZCP of the current in the winding to appear such that the terminal voltage of the winding could be measured while the current in the winding is zero thirdly, analyze the terminal voltage of the winding to get the BEMF fourthly and adjust Ton and engage the commutation of the motor according to the BEMF so as to continuously control the motor lastly.

In conclusion, the proposed method and circuit of the present invention need neither the Hall-effect sensor nor the extra detecting winding but employ the uniquely provided method and circuit for controlling the sensorless single-phase BLDCM based on the motor winding time-sharing to detect the BEMF and the ZCP of the current in the winding so as to adjust the lasting time of the power supply voltage, which forms the BEMF, according to the appearing time of the ZCP and to control the BLDCM continuously.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A controlling method of a brushless DC motor (BLDCM) comprising an inverter, a stator having a winding, a rotor and a controller, wherein a back electromotive force (BEMF) is generated while said rotor rotates, comprising the steps of:
    (a) controlling said inverter to let a first current having a first direction flow to said winding so as to rotate said rotor;
    (b) cutting off a loop flowing therethrough by said first current in said inverter at a first moment, wherein said first current flows through a flywheel current loop and is degenerated to zero at a second moment;
    (c) measuring a terminal voltage of said winding, which is said BEMF, and obtaining a third moment at which said BEMF drops to zero;
    (d) adjusting said first moment by said controller according to a relationship between said third moment and said second moment; and
    (e) employing a second current having a second direction to replace said first current at a fourth moment and then repeating steps (a) to (d).

2. The method according to claim 1, wherein said first direction is in an opposite direction to said second direction.

3. The method according to claim 1, wherein said second moment is a moment when said controller detects that said first current drops to zero.

4. The method according to claim 1, wherein said second moment is a moment at the end of an operation of a specific time-delay program begun after said first moment.

5. The method according to claim 1, wherein said fourth moment satisfies that when said third moment is earlier than said second moment, said fourth moment equals to said second moment, when said third moment is equal to said second moment, said fourth moment equals to said second moment, and when said third moment is later than said second moment, said fourth moment equals to said third moment.

6. The method according to claim 1, wherein said fourth moment satisfies that when said third moment is earlier than said second moment, said fourth moment equals to said second moment, when said third moment is equal to said second moment, said fourth moment equals to said second moment, when said third moment is later than said second moment, said fourth moment is earlier than said third moment, and the higher a rotation speed of said BLDCM is the more said fourth moment is earlier than said third moment when said BLDCM rotates in a relatively high speed.

7. The method according to claim 1, wherein said BLDCM is a single phase BLDCM and a driving alternative of said BLDCM is a bipolar driving.

8. The method according to claim 1, wherein said step (d) further comprises the steps of:
    decreasing a value of said first moment if said third moment is earlier than said second moment;
    decreasing said value of said first moment if said third moment is equal to said second moment;
    maintaining said value of said first moment if said third moment is later than said second moment and a delay time period thereof is less than a predetermined value; and
    increasing said value of said first moment if said third moment is later than said second moment and said delay time period is larger than a predetermined value.

9. The method according to claim 8, wherein said predetermined value is one of zero and a value larger than zero.

10. A controlling circuit of a brushless DC motor (BLDCM) comprising a stator having a winding, comprising:
    a power supply circuit supplying a first current having a first direction;
    an inverter electrically connected to said winding and said power supply circuit, wherein said first current is provided to said winding by switching on said inverter and cut off from said winding by switching off said inverter;
    a BEMF detecting circuit electrically connected to said winding and said inverter and measuring a terminal voltage of said winding when said first current is cut off and a current in said winding drops to zero, which is a back electromotive force (BEMF); and
    a controller electrically connected to said power supply circuit, said inverter and said BEMF detecting circuit and analyzing a status of said BEMF to control said BLDCM accordingly,
    wherein said first current is cut off by said inverter at a first moment, said current in said winding drops to zero at a second moment, said BEMF drops to zero at a third moment, and a value of said first moment is adjusted by said controller according to a relationship between said second moment and said third moment.

11. The controlling circuit according to claim 10, wherein said inverter comprises four switches.

12. The controlling circuit according to claim 10, wherein said power supply circuit comprises at least one selected from the group consisting of a diode, a resistor and a capacitor.

13. The controlling circuit according to claim 10, wherein said BEMF detecting circuit is one of a comparator circuit and a combination of a voltage divider and an over-voltage protection circuit, and comprises a diode and a resistor.

14. The controlling circuit according to claim 10, wherein said controller is engaged in a commutation at a fourth moment and said inverter is switched on by said controller such that said power supply circuit provides a second current, which is in an opposite direction to said first current, to said winding.

15. The controlling circuit according to claim 14, wherein said relationship includes:
    (a) when said third moment is earlier than said second moment, said value of said first moment is decreased by said controller and said inverter is switched on to provide said second current to said winding immediately;
    (b) when said third moment is later than said second moment and a delay time thereof is less than a predetermined value, said value of said first moment is kept unchanged by said controller and said inverter is switched on to provide said second current to said winding at said fourth moment;
    (c) when said third moment is later than said second moment and said delay time is equal to said predetermined value, said value of said first moment is kept unchanged by said controller and said inverter is switched on to provide said second current to said winding at said fourth moment; and
    (d) when said third moment is later than said second moment and said delay time is larger than said predetermined value, said value of said first moment is increased by said controller and said inverter is switched on to provide said second current to said winding at said fourth moment.

16. The controlling circuit according to claim 15, wherein said BLDCM further comprises a rotor, said BEMF is generated in said winding while said rotor rotates, and said controller is employed to decide whether said fourth moment is less than said third moment according to a rotation speed of said rotor.

17. The controlling circuit according to claim 16, wherein said controller is employed to decide whether said fourth moment is equal to said third moment according to said rotation speed of said rotor.

18. The controlling circuit according to claim 10, wherein said BEMF detecting circuit is a comparator circuit.

19. The controlling circuit according to claim 10, wherein said BEMF detecting circuit is an analog-to-digital conversion circuit.

* * * * *